United States Patent [19]
Guehr

[11] 3,763,836
[45] Oct. 9, 1973

[54] COOLANT LOSS AND COOLANT PUMP MALFUNCTION DETECTION SYSTEM FOR INTERNAL COMBUSTION ENGINES

[76] Inventor: Helmut Guehr, Rt. 2, Box 436, Charleston, W. Va.

[22] Filed: Dec. 29, 1970

[21] Appl. No.: 102,407

[52] U.S. Cl............. 123/41.15, 123/198 D, 340/59
[51] Int. Cl...... F01p 5/14, F01p 11/14, H01f 27/02
[58] Field of Search.................. 123/41.15, 198; 340/59

[56] References Cited
UNITED STATES PATENTS

| | | | |
|---|---|---|---|
| 2,618,248 | 11/1952 | Lindberg | 123/41.15 |
| 3,292,427 | 12/1966 | Mattson | 123/41.15 |
| 3,568,648 | 3/1971 | Cass | 123/41.15 |
| 2,988,069 | 6/1961 | Smith | 123/41.15 |
| 3,461,447 | 8/1969 | Marouby | 340/59 |
| 3,495,214 | 2/1970 | Wishart | 340/59 |
| 3,534,352 | 10/1970 | Gallagher | 340/59 |
| 2,700,153 | 1/1955 | Huckabee | 340/59 |
| 3,312,936 | 4/1967 | Huntzinger | 340/59 |
| 3,550,080 | 12/1970 | Wenzel | 340/59 |
| 3,593,270 | 7/1971 | Walker | 340/59 |

Primary Examiner—Laurence M. Goodridge
Assistant Examiner—Ronald B. Cox
Attorney—Edward G. Atkins

[57] ABSTRACT

Coolant loss and coolant pump malfunction in liquid cooling systems of internal combustion engines can be determined by placing a condition sensing device in a coolant inlet passage to a radiator assembly at a point above the coolant level in the radiator assembly and connecting to such condition sensing device an electrical detection circuit responsive to the conditions sensed by the sensing device.

2 Claims, 5 Drawing Figures

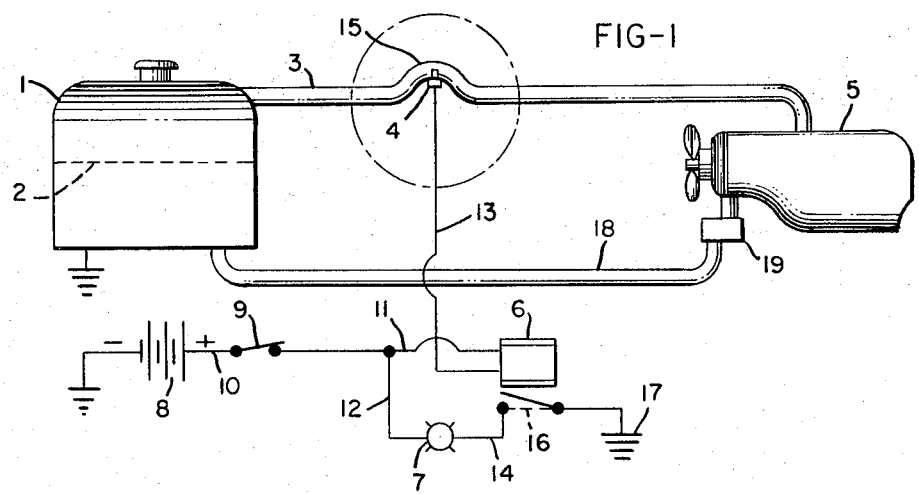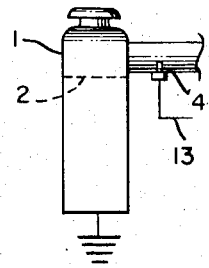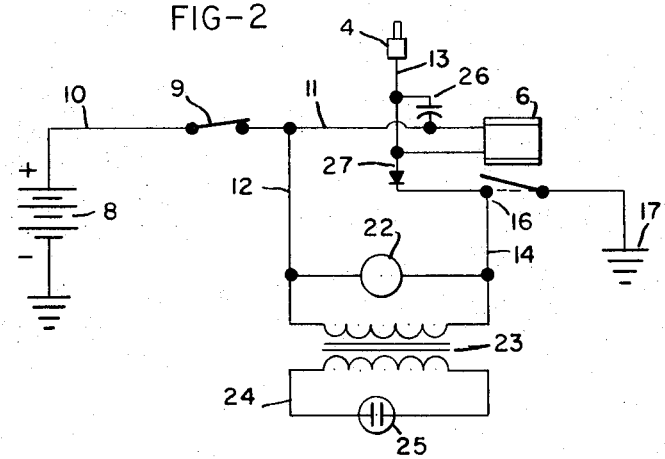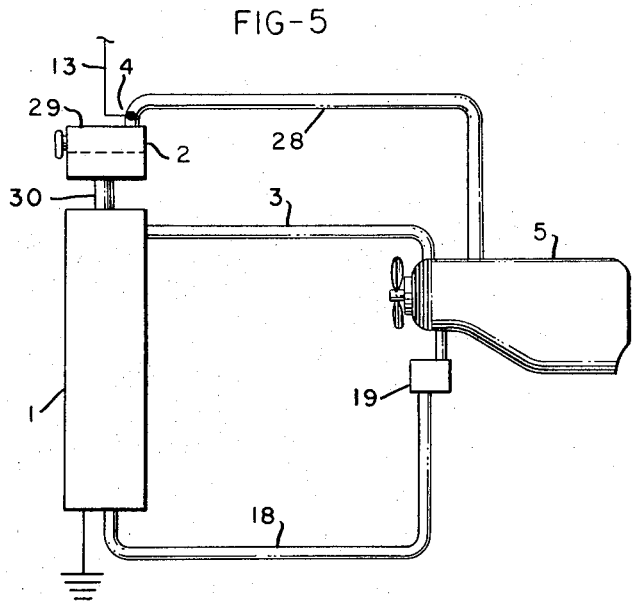

3,763,836

COOLANT LOSS AND COOLANT PUMP MALFUNCTION DETECTION SYSTEM FOR INTERNAL COMBUSTION ENGINES

BACKGROUND OF THE INVENTION

1. Field of the Invention

This invention relates to a device for detecting coolant loss and coolant pump malfunction in liquid cooled internal combustion engines having a radiator assembly and coolant pump. More particularly this invention relates to a condition-sensing device located in a coolant inlet passage to a radiator assembly at a point above the collant level in the radiator assembly and an electrical detection circuit attached to the sensing device and responsive to the conditions sensed by the sensing device.

2. Description of the Prior Art

Various detection devices have been devised for determining coolant levels in radiators of internal combustion engines having a liquid coolant system. Typical of these devices are those described in the patents to McGinty (U.S. Pat. No. 3,179,920), Huntzinger (U.S. Pat. No. 3,312,936), Huckabee (U.S. Pat. No. 2,700,153) and Lindberg, Jr. et al. (U.S. Pat. No. 2,618,248). In each of these devices, however, a condition sensing device, or probe, is located in the radiator, and while being able to indicate water level these devices will not indicate whether there is a pump malfunction in the system.

SUMMARY OF THE INVENTION

A detection device has now been designed which will not only detect coolant loss in liquid cooled internal combustion engines but will also determine whether there is a pump malfunction in the system. Briefly, this device is adapted for use in a cooling system of an internal combustion engine having a radiator assembly; a coolant inlet passage to the radiator assembly; a coolant outlet passage from the radiator assembly and a liquid coolant circulating between the engine and radiator assembly. In this cooling system a condition-sensing device is located in a coolant inlet passage at a point above the coolant level in the radiator assembly. The term radiator assembly includes not only the radiator proper as is commonly used in automobile engines but also includes adjunct devices such as expansion tanks found in cooling systems of some buses and trucks. An electrical detection circuit is attached to the sensing device and is responsive to the conditions sensed by this sensing device.

The system described herein is especially useful in cooling systems of automobiles, buses, trucks and the like. By way of example, the condition-sensing device, usually a copper probe, can be located in a specially adapted radiator inlet hose of an automobile cooling system or in the inlet radiator hose nozzle as will be hereinafter more particularly described. In cooling systems in which expansion tanks are employed as an adjunct to the cooling system such as in some buses and trucks, the probe may be located in the coolant inlet line to the expansion tank. For purposes of this invention the term coolant inlet passage is defined as a passage which allows the coolant from the engine to return to the radiator assembly.

In the operation of this system an electrical current is passed through the probe and into the coolant, usually water, to form a circuit. When the flow of water in the inlet line ceases either because of a sudden water loss in the cooling system or because of a pump malfunction, a light or other indicating means will be activated indicating a malfunction in the cooling system.

BRIEF DESCRIPTION OF THE DRAWINGS

FIG. 1 is a schematic view of the detection system made in accordance with this invention.

FIG. 2 is a partial view of this invention showing a schematic diagram of a more complex detection system.

FIG. 3 is a partial view of a portion of the detection system in which the detection device is located in the inlet radiator hose nozzle.

FIG. 4 is an enlarged view of a portion of FIG. 1 showing more detail.

FIG. 5 is a partial view of this invention in which the detection device is located in a coolant inlet passage to an expansion tank of a cooling system.

DESCRIPTION OF THE PREFERRED EMBODIMENTS

Referring now to FIG. 1, engine 5 is an internal combustion engine of the liquid cooled variety in which a liquid coolant such as water is circulated through the cooling jacket of the engine via pump means 19 then through the radiator inlet passage 3 to radiator 1 and then finally back to the engine via a radiator outlet passage 18. Thus, the cooling system described is the standard one generally used in automotive systems.

Of special importance is radiator inlet hose 3 connecting radiator 1 and engine 5. There must be at least one point in this connection which is above the water level 2 in radiator 1. In FIG. 1 the connection, usually a rubber hose, has a hump or elevated Section 15 which at its lowest point is above water level in the radiator.

Inserted in this radiator inlet hose 3 at the hump 15 is a probe 4. This probe is made of an electrically conductive metal and is preferably copper. Under normal operating conditions, liquid coolant is pumped through the engine cooling system by the pump 19. The liquid coolant will pass over the probe which is responsive to this condition as normal. If the pump ceases to function, or if there is a sudden coolant loss in the system, no coolant will come in contact with the probe which is responsive to a circuit indicating this condition as abnormal.

In the operation of the detection system shown in FIG. 1, a current generated by battery 8 is passed through lead 10 through switch (ignition switch) 9 which is shown in the closed position. Current thus passing through switch 9 is divided into two circuits. One circuit consists of current through lead 11 through relay 6 and then through lead 13 which is completed through the coolant flowing to the radiator and thence to ground. The other circuit consists of current through lead 12, through light 7, and through lead 14.

In the normal operation when coolant is flowing across probe 4, a circuit is established through the radiator to ground and is of sufficient strength to hold relay 6 open as indicated by the solid line. Sensitive relays are available such as Sigma 5 F- 5000S- SIL from the Sigma Relay Corporation, which will operate in this system on a current of 1 milliamp. Other relays are available which will operate, if needed, on even smaller currents. If for some reason, such as coolant loss in the system or pump failure, coolant does not contact probe 4 this circuit is broken thus closing the relay at point 16 as indicated by the dotted line. When relay 6 closes, a circuit is then established to ground 17 causing light 7 to flash on. This light, which will be on a vehicle instrument panel will signal the operator of a malfunction in the cooling system.

FIG. 2 shows a somewhat more sophisticated detector circuit then shown in FIG. 1. The advantage of this circuit lies in having both an audible and visual indication of malfunction in the cooling system. For simplicity the cooling system in which probe 4 is inserted has been omitted from FIG. 2. The cooling system is the same as shown in FIG. 1.

In the operation of the detection system shown in FIG. 2, a current generated by battery 8 is passed through lead 10 through ignition switch 9 as described in FIG. 1. Similarly current passing through switch 9 is divided into two circuits. One curcuit, the same as described in FIG. 1, consists of current through lead 11, through relay 6 and then through lead 13. The other circuit consists of current through lead 12, through buzzer 22 and transformer 23 connected in parallel, then through lead 14.

In the normal condition when coolant is flowing across probe 4, a circuit is established and is of sufficient strength to hold relay 6 open as indicated by the solid line. Current through lead 14 is prevented from making a complete circuit because of diode 27. Because no circuit is complete through lead 14, buzzer speaker or other sound producing means 22 and neon light 25 do not operate. If coolant does not contact probe 4 because of a malfunction in the cooling system, the circuit through the coolant is broken thus closing the relay at point 16 as indicated in FIG. 2 by the dotted line. When relay 6 closes a circuit is then established to ground 17 causing speaker 22 to operate. Current under this condition is also established through transformer 23. Transformer 23 is shown in this figure to produce the necessary stepped-up voltage through circuit 24 which is necessary for the operation of neon light 25.

Capacitor 26 is placed across the circuit between the probe 4 and relay 6 for the purpose of regulating the on and off operation of the relay. Without capacitor 26 the relay as described in this figure will open and close at a very rapid rate causing the relay points to wear. With capacitor 26 the operation of the relay can be slowed considerably thus reducing wear.

FIG. 3 shows an alternative position in the cooling system for probe 4. In this instance probe 4 is inserted in radiator inlet hose nozzle 2 which is the standard type connection for radiator hoses. The advantage of having the probe in the radiator inlet hose nozzle is permanency. A new connection would not be required each time a radiator hose is changed. Since only this nozzle would require adaptation and not the hoses themselves, it is anticipated that this configuration would be more economically advantageous. Of course, as indicated above, the probe must be located at a point above the water level in the radiator.

FIG. 4 is an enlarged view of that section of FIG. 1 in which the probe 4 is located in the elevated portion of the coolant inlet passage. In this figure, probe 4 is shown as attached and passing through a plastic or other electrically nonconductive material seal to lead 13 which is in turn connected to the remainder of the electrical detection circuit which is not shown. The nonconductive piece 20 is itself attached to the wall 31 of the coolant inlet passage by means of screws or rivets 21 to form a liquid seal.

FIG. 5 is a view of this detection device as it could be used in cooling systems employing expansion tanks, the tank and radiator proper being referred to as the radiator assembly. These types of cooling systems are normally found in buses, trucks or other heavy duty equipment. In addition to radiator 1, coolant inlet passage 3, coolant outlet passage 18, engine 5 and pump 19 there is included in the system an expansion tank 29 which communicates with radiator 1 via passage 30. In addition to coolant inlet line 3 there is an additional line 28 from the cooling jacket of engine 5 to the expansion tank 29. This line, sometimes called a vent line, allows coolant to pass directly from the engine to tank 29. Probe 4 is located in coolant inlet line 28 above the water level 2 in the radiator assembly. Current is carried through probe 4 via lead 13. The operation of the detection circuit is essentially as stated above. In this configuration the probe may also be adapted for use in a permanent expansion tank inlet hose nozzle similar to that configuration shown in FIG. 3. Here again an economic advantage could be realized.

I claim:

1. In a cooling system of an internal combustion engine having radiator means, a radiator inlet hose to the radiator means, a coolant outlet passage from the radiator means, and an electrically conductive grounded liquid coolant circulating between the engine and the radiator means, the improvement which comprises:
   a. an electrically conductive probe means for immersion into the circulating liquid coolant located in the radiator inlet hose and at a point above the coolant level in the radiator means, and
   b. an electrical detection circuit attached to the probe means comprising in combination, a source of electrical energy, switch means, light indicating means, relay means, and circuit means connected to said probe means, switch means, light indicating means, relay means, and source of electrical energy, said circuit means being responsive to the breaking of electrical contact of said probe means with said liquid as a result of said liquid being out of contact with said probe means said breaking of electrical contact effectuating lighting of said light indicating means through the closing of said relay means said closing of the relay means causing a circuit to be established between the source of electrical energy, light indicating means and ground, wherein the electrical detection circuit attached to the probe means comprises in combination, a source of electrical energy, switch means, sound-producing means, relay means, diode means, transformer means, light indicating means, and circuit means connecting said probe means, switch means, sound-producing means, relay means, diode means, transformer means, light indicating means, and source of electrical energy, said circuit means being responsive to the breaking of electrical contact of said probe means with said liquid as a result of said liquid being out of contact with said probe means, said breaking of electrical contacting effectuating the operation of the sound-producing means and light indicating means connected in parallel through the closing of said relay means, said closing of the relay means causing a circuit to be established between the source of electrical energy, sound-producing means, light indicating means, and ground with said transformer being interposed in the circuit between the sound-producing means and light indicating means, a circuit between the source of electrical energy, light indicating means, sound-producing means, and probe means being prevented by the diode means interposed between the probe means and the contact point of the relay.

2. In a cooling system of an internal combustion engine having a radiator, an expansion tank in communication with said radiator, a radiator inlet hose to the radiator, a coolant outlet passage from the radiator, a coolant inlet passage to the expansion tank, and an electrically conductive grounded liquid coolant circulating between the engine and the radiator and improvement which comprises:
   a. an electrically conductive probe means for immersion into the circulating liquid coolant located in the coolant inlet passage to the expansion tank at a point above the coolant level in the expansion tank; and
   b. an electrical detection circuit attached to the probe means comprising in combination, a source of electrical energy, switch means, light indicating means, relay means, and circuit means connected to said probe means, switch means, light indicating means, relay means, and source of electrical energy, said circuit means being responsive to the breaking of electrical contact of said probe means with said liquid as a result of said liquid being out of contact with said probe means said breaking of electrical contact effectuating lighting of said light indicating means through the closing of said relay means said closing of the relay means causing a circuit to be established between the source of electrical energy, light indicating means and ground, wherein the electrical detection circuit comprises in combination, electrically conductive probe means for immersion into an electrically grounded liquid, a source of electrical energy, switch means, sound-producing means, relay means, diode means, transformer means, light indicating means, and circuit means connecting said probe means, switch means, sound-producing means, relay means, diode means, transformer means, light indicating means, and source of electrical energy, said circuit means being responsive to the breaking of electrical contact of said probe means with said liquid as a result of said liquid being out of contact with said probe means, said breaking of electrical contact effectuating the operation of the sound-producing means and light indicating means connected in parallel through the closing of said relay means, said closing of the relay means causing a circuit to be established between the source of electrical energy, sound-producing means, light indicating means, and ground with said transformer being interposed in the circuit between the sound-producing means and light indicating means, a circuit between the source of electrical energy, light indicating means, sound-producing means, and probe means being prevented by the diode means interposed between the probe means and the contact point of the relay.

* * * * *